E. SAGER.
AUTOMATIC TRAIN STOP.
APPLICATION FILED APR. 29, 1921.
1,397,055.
Patented Nov. 15, 1921.
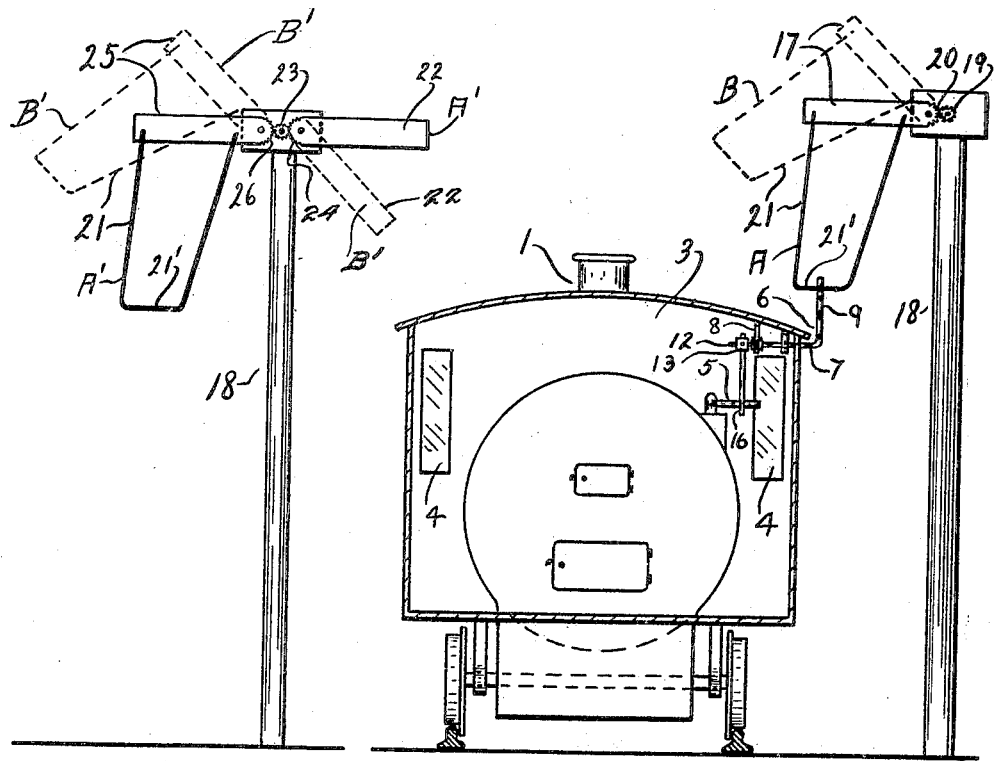
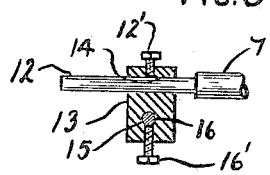
Fig. 4
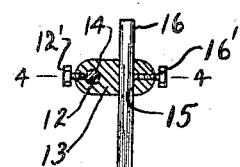
Fig. 3
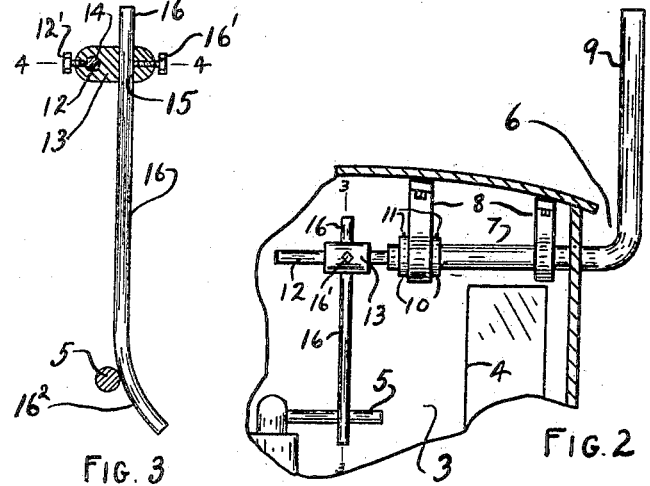
Fig. 2
INVENTOR
ERFERD SAGER

UNITED STATES PATENT OFFICE.

ERFERD SAGER, OF HAMILTON, ONTARIO, CANADA.

AUTOMATIC TRAIN-STOP.

1,397,055.  Specification of Letters Patent.  Patented Nov. 15, 1921.

Application filed April 29, 1921. Serial No. 465,487.

*To all whom it may concern:*

Be it known that I, ERFERD SAGER, a subject of the King of Great Britain, and a resident of the city of Hamilton, in the county of Wentworth, in the Province of Ontario, Dominion of Canada, have invented certain new and useful Improvements in Automatic Train-Stops, of which the following is a specification.

My invention relates to improvements in automatic train stops and the object of the invention is to provide for the automatic stopping of a train in the event of its passing a signal which is set against the train.

My invention consists essentially of a substantially vertically disposed, operating lever pivotally mounted intermediately of its length within the cab of a locomotive, a depending bracket rigidly carried by the ordinary semaphore arm, the upper branch of the lever co-acting with the depending bracket and the lower branch co-acting with the emergency brake throttle of the locomotive, whereby the operating lever is oscillated and the emergency brake throttle moved to apply the brakes, should the locomotive pass the semaphore when same is in the position to be set against the train, all as hereinafter more particularly described and illustrated in the accompanying drawings in which:

Figure 1 is a diagrammatic rear view of a locomotive showing my invention applied thereto.

Fig. 2 is an enlarged fragmentary rear view of a portion of a locomotive showing the manner of mounting my operating lever, and the manner in which the emergency brake throttle is engaged thereby.

Fig. 3 is a section on the line 3, 3 of Fig. 2.

Fig. 4 is a section on the line 4, 4 of Fig. 3.

Fig. 5 shows a modified construction to be used with a different type of semaphore.

Like characters of reference indicate corresponding parts in the different views.

1 is a locomotive operating on the track 2 and 3 is the cab thereof having the usual windows 4.

5 is the emergency brake throttle.

6 is an operating lever having the horizontally disposed portion 7 which extends laterally through the side wall of the cab and is journaled in hangers 8 depending from the roof of the cab.

At the outer end of the portion 7 is the upwardly extending arm 9 for a purpose as will presently appear.

10 are collars secured to the portion 7 by the pins 11 and serve to prevent longitudinal movement thereof.

12 is an inwardly extending portion of reduced diameter carried by the portion 7.

13 is a bracket provided with a longitudinal orifice 14 adapted to slidably receive the portion 12.

The bracket 13 is also provided with a vertical orifice 15 adapted to slidably receive a depending bar 16.

$12^1$ and $16^1$ are set screws carried by the bracket 13 and adapted to engage respectively the portion 12 and the bar 16.

The lower end of the bar 16 is curved rearwardly at $16^2$ for a purpose as will presently appear.

17 is the semaphore arm which is carried by a post 18 and is operated by the pinion 19 engaging the toothed quadrant 20.

Rigidly carried by the semaphore arm 17 and depending therefrom is a bracket 21. This bracket is so disposed that, when the signal is closed, that is when the semaphore arm is lowered so that the signal is set against the train, the lower portion $21^1$ of the bracket lies in the path of the upwardly extending portion 9 of the lever 6. This position is shown in full lines at A in Fig. 1.

When the signal is open, that is when the semaphore arm is raised, indicating that the track is clear for the train to pass, the bracket 21 is raised entirely clear of the locomotive and out of operative engagement with the portion 9. This position is shown in dotted lines at B in Fig. 1.

In Fig. 1 is shown the construction adopted when the semaphore arm extends inwardly toward the track.

In some cases however, a reverse system is used in which the semaphore arm extends outwardly away from the track.

The construction in this case must be slightly modified and is illustrated in Fig. 5.

22 is the semaphore arm which is operated as previously described by the pinion 23 and toothed quadrant 24.

25 is an auxiliary arm extending inwardly toward the track and is mounted similarly to the semaphore arm 22 and carries the toothed quadrant 26 which also engages the pinion 23.

The depending bracket 21 is carried by this auxiliary arm 25 in exactly the same manner as previously described.

The construction and operation of my invention is as follows:

The operating lever 6 comprises the horizontal portions 7 and 12, the upwardly extending portion 9 and the depending arm 16 carried by the bracket 13 and since normally the arms 9 and 16 are vertical, it will be evident that this operating lever 6 constitutes a substantially vertically disposed lever pivotally mounted intermediately of its length and that the arms 9 and 16 are free to oscillate forwardly and rearwardly in vertical planes about the horizontal portion 7.

In fitting the invention to a locomotive it will of course be necessary to properly adjust the lateral position of the arm 9 so that it will engage the bracket 21 on the semaphore arm.

When the proper setting is obtained the lever is secured against longitudinal movement by the collars 10 which are secured by the pins 11.

Also the setting of the depending bar 16 must be adjusted both horizontally and vertically to properly engage the emergency brake throttle 5.

The vertical adjustment is obtained by loosening the set screw $16^1$ and sliding the bar through the orifice 15. The horizontal adjustment is obtained by loosening the set screw $12^1$ and sliding the bracket 13 along the portion 12.

The lever 6 is suspended from the roof of the cab by the hangers 8 and normally occupies a position with the arms 9 and 16 substantially vertical, and the lower end of the bar 16 extending to the rear side of the emergency brake throttle 5.

The depending bracket 21 is rigidly secured to the semaphore arm 17 and is so arranged that when the signal is closed, that is when it is set against the train with the semaphore arm lowered as shown in full lines at A in Fig. 1, the lower end $21^1$ of the bracket lies in the path of the portion 9 of the operating lever 6.

Consider the train to be traveling forwardly along the track 2 in Fig. 1 and the semaphore to be set against the train.

In this position the semaphore arm 17 and bracket 21 will be as shown in full lines at A.

It will be evident that should the engineer in charge fail to act on the signal and stop the train, that as the locomotive passes the semaphore the upwardly extending arm 9 will engage the lower end $21^1$ of the bracket 21 and will be forced rearwardly thereby. This will oscillate the operating lever 6 and the depending bar 16 thereof will be oscillated forwardly engaging the emergency brake throttle 5 and moving it forwardly, thus applying the emergency brakes and bringing the train to a standstill.

The lower end of the depending bar 16 is curved rearwardly as at $16^2$, so that it will more readily clear the brake throttle 5 after it has moved it sufficiently far forward.

If the signal is open, in which case the semaphore arm will be raised indicating that the track is clear for the train to proceed, the bracket 21 is also raised entirely clear of the locomotive and no engagement is made with the operating lever 6. This position is as shown in dotted lines at B in Fig. 1.

The foregoing description applies to that type of signal in which the semaphore arm extends inwardly toward the track but when my invention is to be applied to a signal system in which the semaphore arm extends away from the track, it is necessary that an auxiliary arm extending inwardly toward the track be used to carry the depending bracket 21.

This construction is illustrated in Fig. 5 and it will readily be apparent that the operation of the stopping devices are the same as already described since the auxiliary arm 25 operates synchronously with the semaphore arm 22.

In this modified construction the closed and open positions of the signal are indicated respectively at $A^1$ in full lines and at $B^1$ in dotted lines.

Many modifications might be made in my invention without departing from the spirit thereof or the scope of the claims and therefore the forms shown are to be taken as illustrative only and not in a limiting sense.

For instance other ways of mounting the operating lever could be used and also various other forms of bracket 21 could be used.

From the foregoing it will be seen that I have devised an improved train stop which will be entirely automatic and positive in operation and which will render it impossible for a train to proceed past a signal which is set against it.

What I claim as my invention is:

1. In a locomotive, the combination with the locomotive and the emergency brake throttle thereof, of an operating lever carried by the locomotive and pivotally mounted intermediately of its length, said lever having freedom of oscillation about a horizontal axis, the lower portion of the lever engaging the rear of the emergency brake throttle and the upper portion projecting upwardly above the locomotive and situated without the locomotive.

2. In a locomotive, the combination with the locomotive and the emergency brake throttle, thereof, of a substantially vertically disposed operating lever carried by locomotive and pivotally mounted intermediately of its length, said lever having freedom of oscillation about a horizontal axis, the lower end of said lever engaging the rear of the emergency brake throttle and the upper end extending upwardly above the locomotive.

3. In a locomotive, the combination with the locomotive and the emergency brake throttle thereof, of a Z-shaped lever having its center branch disposed horizontally and transversely of the locomotive said center branch being pivotally mounted upon the locomotive, the end branches normally disposed vertically, the depending end branch engaging the rear of the emergency brake throttle and the other end branch situated without the locomotive and extending upwardly above the locomotive.

4. In a locomotive, the combination with the locomotive and the emergency brake throttle thereof, of a Z-shaped lever having its center branch disposed horizontally and transversely of the locomotive and extending laterally through the side of the locomotive, said center branch being pivotally mounted upon the locomotive, the end branches normally disposed vertically, the inner end branch depending downwardly and engaging the rear of the emergency brake throttle, and the outer end branch situated without the locomotive and projecting upwardly above the locomotive.

5. In a locomotive, the combination with the locomotive and the emergency brake throttle thereof, of a Z-shaped lever having its center branch disposed horizontally and transversely of the locomotive and extending laterally through the side of the locomotive, said center branch being pivotally mounted upon the locomotive, the end branches normally disposed vertically, the inner end branch depending downwardly and engaging the rear of the emergency brake throttle, the outer end branch situated without the locomotive and projecting upwardly above the locomotive and means for adjusting the lever transversely of the locomotive.

6. In a locomotive, the combination with the locomotive and the emergency brake throttle thereof, of a Z-shaped lever having its center branch disposed horizontally and transversely of the locomotive and extending laterally through the side of the locomotive, said center branch being pivotally mounted upon the locomotive, the end branches normally disposed vertically, the inner end branch depending downwardly and engaging the rear of the emergency brake throttle, the outer end branch situated without the locomotive and projecting upwardly above the locomotive and means for adjusting the depending inner end branch transversely and vertically.

ERFERD SAGER.

Witnesses:
  JOHN G. MAYNARD,
  NORIEEN COLES.